S. B. HULBERT.
LIQUOR RECTIFYING CYLINDER.
No. 174,532. Patented March 7, 1876.
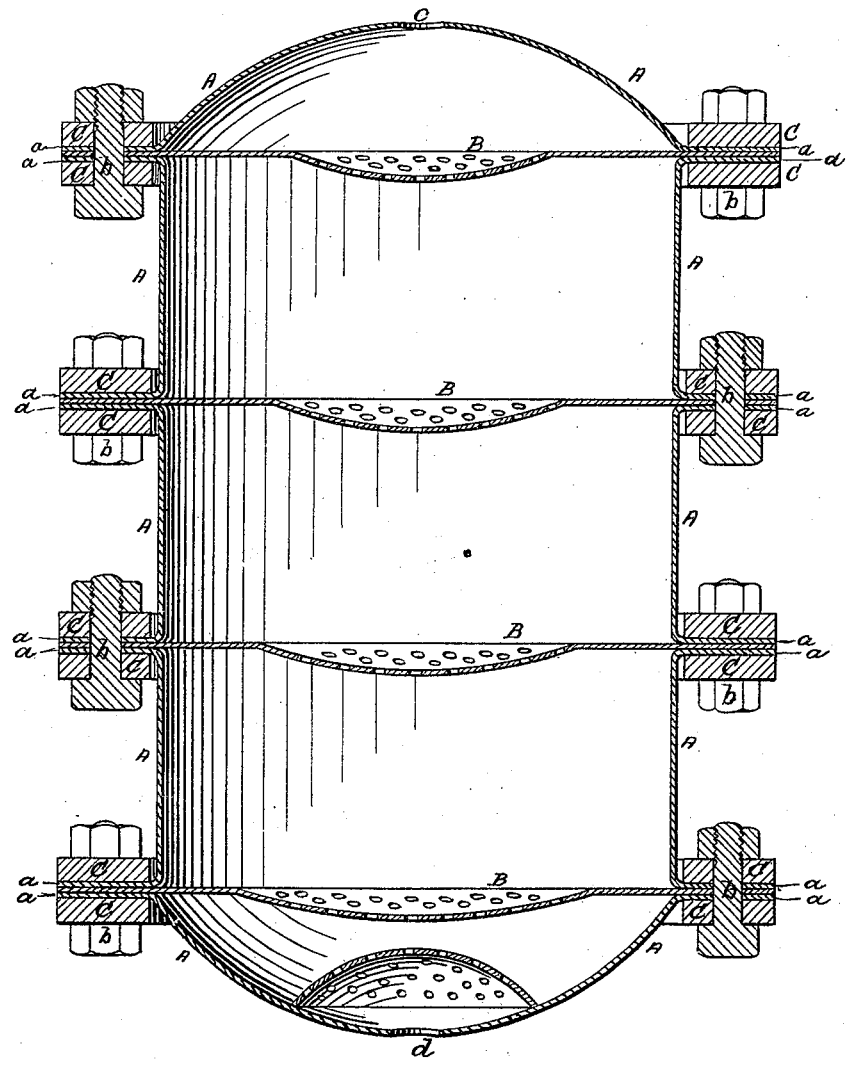

UNITED STATES PATENT OFFICE.

SAMUEL B. HULBERT, OF NEW YORK, N. Y.

IMPROVEMENT IN LIQUOR-RECTIFYING CYLINDERS.

Specification forming part of Letters Patent No. 174,532, dated March 7, 1876; application filed February 29, 1876.

*To all whom it may concern:*

Be it known that I, SAMUEL B. HULBERT, of the city, county, and State of New York, have invented certain new and useful Improvements in Liquor-Rectifying Cylinders, of which the following is a specification:

The object of my invention is to provide a filter for effectually removing impurities from spirituous liquors forced through said filter under pressure, and to so construct the filtering-cylinder that "channeling," which is found to be a serious defect in cylinders heretofore used for this purpose, will be obviated.

The nature of my improvements can best be explained and understood by reference to the accompanying drawing, which represents a longitudinal central section of a rectifying or filtering cylinder embodying my improvements.

The cylinder, made preferably of copper, is formed of horizontally-flanged sections A, and is divided into compartments by diaphragms or perforated metallic screens B, also preferably made of copper. A screen is applied at each joint in the cylinder, and is secured in place by its outer edge or rim, which extends between the flanges a of each two adjoining sections. The flanges a and intervening screen, at each joint, are bound together by a pair of heavy wrought-metal bands or rings, e, which encompass the cylinder, and embrace between them the flanges and the rim of the screen. The rings are drawn together by means of bolts and nuts, b. They serve in a measure to re-enforce the cylinder; but it is, however, desirable that they should in the first instance fit the cylinder somewhat loosely, in order to allow for the expansion of the latter when subjected to heat and internal pressure. The bands serve also to make a tight joint between the sections, and to bind the screens securely in place.

To prevent the screens from tearing out or breaking away from the sides of the cylinder when the latter expands, I prefer to give them a dished or concavo-convex form, as shown in the drawing, this formation being extended to more or less of the area of each screen, as desired.

The perforations may be confined to the dished or concavo-convex portion of the screen, or they may extend over a greater or less portion of the screen—even up to the walls of the cylinder, if desired; in this case, however, they should preferably decrease in number and size, as they approach the walls of the cylinder.

I prefer also, on some accounts, to increase the perforated area in each succeeding screen, from the top downward, as shown in the drawing, but this is not indispensable.

The inlet to the cylinder is at $c$, and the outlet at $d$. The spaces between the screens are, as will be understood by those skilled in the art to which my invention relates, packed with purifying material, consisting of any suitable filtering substance, such as powdered charcoal, peroxide of manganese, &c.

Cylinders as heretofore constructed, when subjected to internal pressure sufficient to force the liquor through, are found to expand, thereby creating a space or opening of from $\frac{1}{4}$ to $\frac{1}{2}$ inch between the packing and the sides of the cylinder, through which the liquor finds its way without passing through the filtering medium. The same trouble is experienced when it is desired to renew or recarbonize the purifying medium by forcing through it ordinary or superheated steam.

My invention is well adapted to overcome this difficulty. The screens, being located at short distances apart, one at each joint in the cylinder, serve, in conjunction with the wrought-metal bands, to strengthen and bind the cylinder, and to prevent that undue expansion which is the prime cause of "channeling."

In a cylinder constructed as I have herein described, the perforations in the screens may be carried even up to the walls of the cylinder without prejudicial effect.

I would state, in conclusion, that I am aware that a filtering-cylinder for rectifying liquor by steam has heretofore been used. I am also aware that it is not new with me to build said cylinder of several sections. I would also state that I do not here claim increasing the perforated area in the successive screens from the top downward, nor do I here claim screens for liquor-rectifying cylinders combining a central perforated area with an imperforate surrounding ring or outer portion intervening between the perforations and the sides of the cylinder.

What I here claim, and desire to secure by Letters Patent, is as follows:

1. In a liquor-rectifying cylinder, a metallic perforated screen of dished or concavo-convex form, secured at its rim to the sides or walls of the cylinder, substantially as and for the purposes set forth.

2. The combination, in a liquor-rectifying cylinder, of flanged sections, perforated metallic screens, whose rims extend between the section-flanges, and re-enforcing wrought-metal bands embracing the flanges and screens, and bound together by bolts which pass also through the flanges and screens, substantially as set forth.

3. In a sectional liquor-rectifying cylinder, the combination, with contiguous flanged cylinder-sections, of a perforated metallic dished or concavo-convex screen, whose outer edge extends between the section-flanges, and a pair of wrought-metal bands, which clasp between them the flanges and the screen, and are bolted together, substantially as shown and set forth.

In testimony whereof I have hereunto signed my name this 25th day of February, A. D. 1876.

S. B. HULBERT.

Witnesses:
  M. BAILEY,
  EWELL A. DICK.